(12) United States Patent
Nakamura

(10) Patent No.: US 11,217,275 B2
(45) Date of Patent: Jan. 4, 2022

(54) DISK DEVICE HAVING HEAD-SUPPORT ARMS WITH REDUCED THICKNESS REGIONS THAT OVERLIE DISK REGIONS WHEN IN A PARKED STATE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yoshihiko Nakamura, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/547,411

(22) Filed: Aug. 21, 2019

(65) Prior Publication Data

US 2020/0286509 A1 Sep. 10, 2020

(30) Foreign Application Priority Data

Mar. 4, 2019 (JP) .............................. JP2019-038827

(51) Int. Cl.
*G11B 5/48* (2006.01)
*G11B 5/54* (2006.01)
*G11B 21/22* (2006.01)
*G11B 5/55* (2006.01)

(52) U.S. Cl.
CPC .......... *G11B 5/4833* (2013.01); *G11B 5/4813* (2013.01); *G11B 5/54* (2013.01); *G11B 21/22* (2013.01); *G11B 5/484* (2013.01); *G11B 5/5573* (2013.01)

(58) Field of Classification Search
None
See application file for complete search history.

(56) References Cited

U.S. PATENT DOCUMENTS 5,854,725 A * 12/1998 Lee ........................... G11B 5/58
360/266
6,473,271 B1 * 10/2002 Rahman et al. ...... G11B 5/4833
360/266
6,480,361 B1 * 11/2002 Patterson ................. G11B 5/54
360/254.3

(Continued)

FOREIGN PATENT DOCUMENTS

JP 2010-146686 A 7/2010
JP 2011-248931 A 12/2011

*Primary Examiner* — Craig A. Renner
(74) *Attorney, Agent, or Firm* — Kim & Stewart LLP

(57) ABSTRACT

A disk device includes a magnetic disk having a data non-recording region, and a data recording region inside the data non-recording region, a plurality of heads configured to read and write information from and onto the magnetic disk, and a plurality of arms supporting the heads, the arms being rotatable to move the heads from a parked position to a desired data recording position above or below the magnetic disk. Each of the arms comprises an overlapping region that overlaps the data recording region of the magnetic disk in a thickness direction of the magnetic disk when the heads are at the parked position.

14 Claims, 10 Drawing Sheets

(56) References Cited

U.S. PATENT DOCUMENTS

| | | | |
|---|---|---|---|
| 7,440,234 B1* | 10/2008 | Cheng et al. | G11B 5/4833 360/266 |
| 7,453,669 B2 | 11/2008 | Choi et al. | |
| 7,755,866 B1* | 7/2010 | Ziaei | G11B 5/4833 360/266 |
| 7,768,745 B2 | 8/2010 | Okada et al. | |
| 7,848,057 B1* | 12/2010 | Shukla | G11B 21/22 360/254.3 |
| 2001/0043441 A1* | 11/2001 | Kishi et al. | G11B 5/54 360/254.8 |
| 2002/0186511 A1* | 12/2002 | Tsuda et al. | G11B 5/5521 360/265.9 |
| 2002/0186512 A1* | 12/2002 | Kubotera et al. | G11B 5/5565 360/266 |
| 2003/0016473 A1* | 1/2003 | Kim | G11B 5/5521 360/266 |
| 2003/0043511 A1* | 3/2003 | Huynh | G11B 5/5526 360/265.9 |
| 2005/0141135 A1* | 6/2005 | Soga et al. | G11B 5/4833 360/265.9 |
| 2005/0168867 A1* | 8/2005 | Miyajima | G11B 5/54 360/97.14 |
| 2005/0270699 A1 | 12/2005 | Takahashi | |
| 2006/0114614 A1* | 6/2006 | Tsujino et al. | G11B 5/5526 360/266 |
| 2008/0019033 A1* | 1/2008 | Park et al. | G11B 5/59633 360/75 |
| 2010/0073821 A1* | 3/2010 | Matsui | G11B 5/54 360/235.4 |
| 2010/0157481 A1 | 6/2010 | Kudo | |

\* cited by examiner

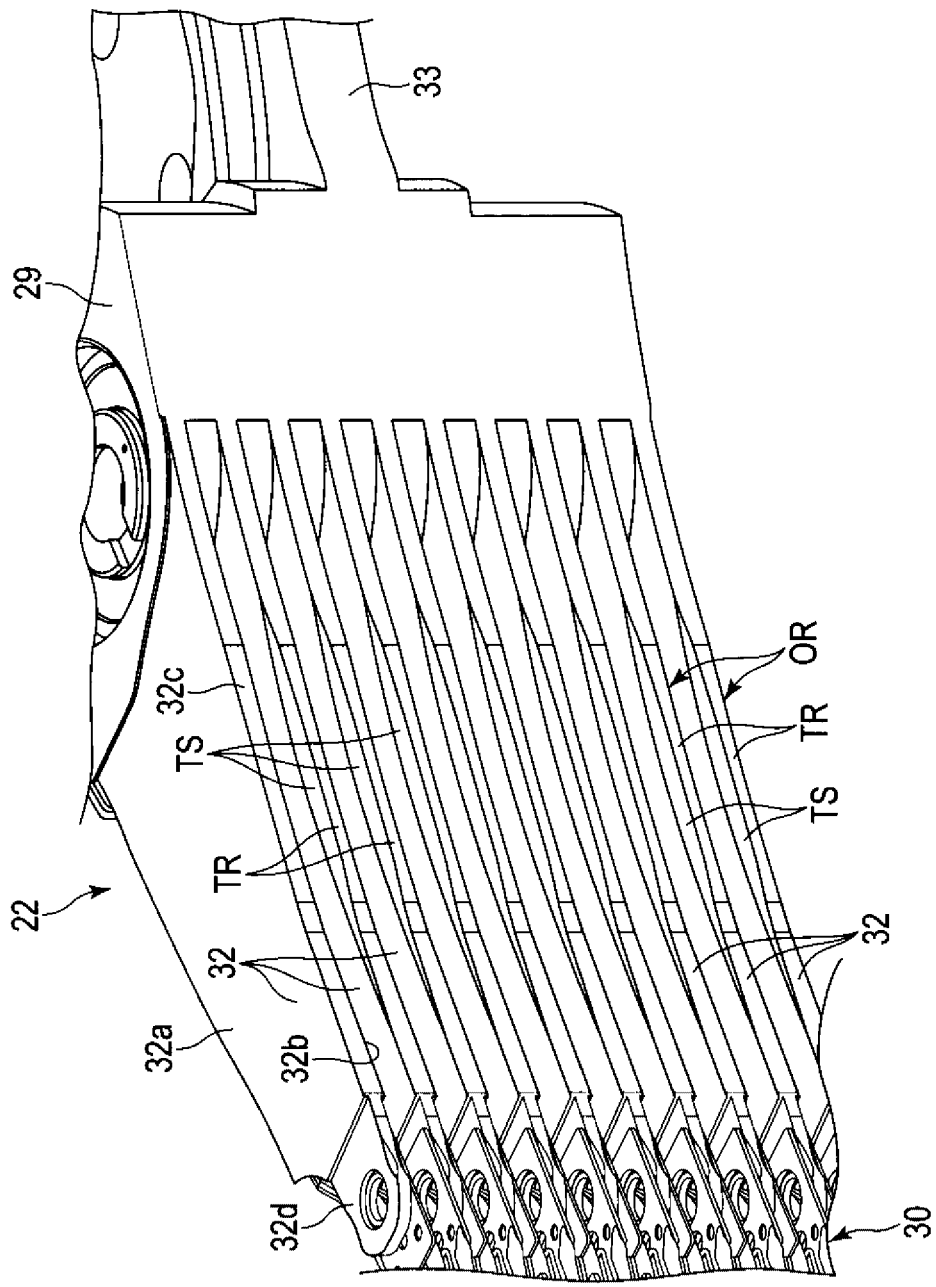

US 11,217,275 B2

DISK DEVICE HAVING HEAD-SUPPORT ARMS WITH REDUCED THICKNESS REGIONS THAT OVERLIE DISK REGIONS WHEN IN A PARKED STATE

CROSS-REFERENCE TO RELATED APPLICATION(S)

This application is based upon and claims the benefit of priority from Japanese Patent Application No. 2019-038827, filed Mar. 4, 2019, the entire contents of which are incorporated herein by reference.

FIELD

Embodiments described herein relate generally to a disk device.

BACKGROUND

A disk device, for example, a hard disk drive (HDD), includes a plurality of magnetic disks disposed in a casing to be rotatable, a plurality of magnetic heads to read and write information from and onto the magnetic disks, and a head actuator to support the magnetic heads movably relative to the magnetic disks.

The head actuator includes an actuator block that is rotatably supported, a plurality of arms extending from the actuator block, and a plurality of head suspension assemblies (e.g., head gimbal assemblies) secured to the respective arms to support the magnetic heads at distal ends.

In order to increase the number of data recording regions in accordance with an increase in the capacity of the HDD, there is a demand for increasing the number of the magnetic disks mounted in one casing and increasing an outer diameter of the magnetic disks. As the number of the magnetic disks stacked in a limited height casing and the number of the actuator arms increase, the magnetic disks and the actuator arms are designed with decreased thickness, and clearances between these components have become smaller.

DESCRIPTION OF THE DRAWINGS

FIG. 9 is a perspective view of the head actuator of an HDD according to a second embodiment.

DETAILED DESCRIPTION

Figure 1:
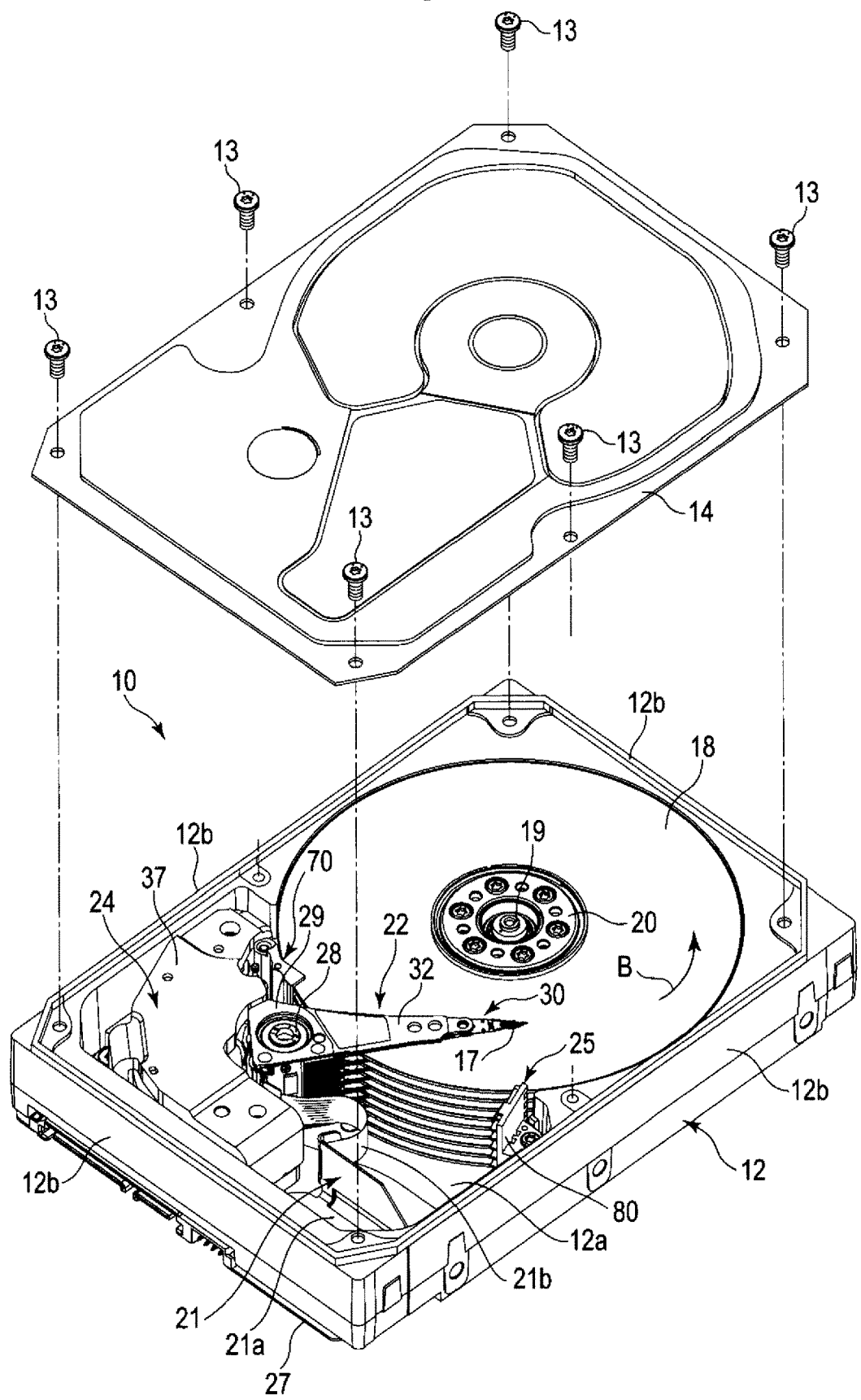
FIG. 1 is an exploded perspective view of a hard disk drive (HDD) according to a first embodiment.

In the disk device according to embodiments, the clearances between the components are narrowed, and so mechanical stress applied from the outside makes the magnetic disks and the arms more likely to come into contact with each other even when the heads are in an unloaded, parked state. Moreover, when data recording regions of the magnetic disks come into contact with the arms, the data recording regions may be damaged to cause a defect in recorded data.

Further embodiments provide a disk device with improved shock resistance.

In general, according to one embodiment, a disk device includes a magnetic disk having a data non-recording region, and a data recording region inside the data non-recording region, a plurality of heads configured to read and write information from and onto the magnetic disk, and a plurality of arms supporting the heads, the arms being rotatable to move the heads from a parked position to a desired data recording position above or below the magnetic disk. Each of the arms comprises an overlapping region that overlaps the data recording region of the magnetic disk in a thickness direction of the magnetic disk when the heads are at the parked position.

Description will now be made on disk devices according to embodiments with reference to the drawings.

It should be noted that the present disclosure is provided for purposes of illustrating examples only, and that appropriate modifications that can be readily made by one of ordinary skill in the art, fall within the scope of the present disclosure. In order to clarify the description, the drawings schematically illustrate dimensions, shapes, and other aspects of the components. The drawings are merely provided as examples and do not limit the scope of the present disclosure. In this description and the drawings, substantially the same components that have been described with reference to the drawings, are denoted with identical reference numerals and signs, and will not be further described.

(First Embodiment) A hard disk drive (HDD) according to a first embodiment will be described in detail.

Figure 2:
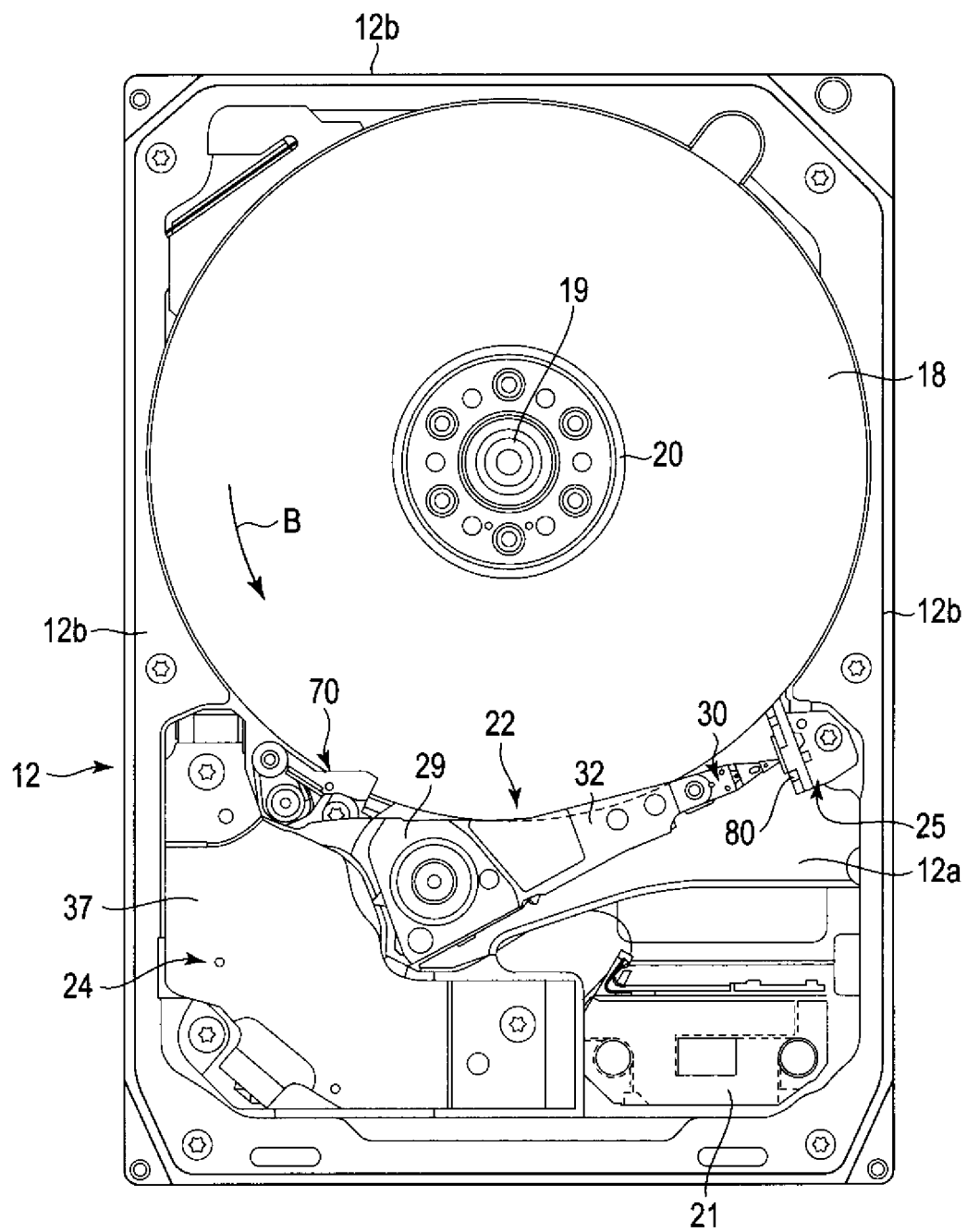
FIG. 2 is a plan view of the HDD in a state without a top cover.

FIG. 1 is an exploded perspective view of the HDD according to this embodiment, with its cover being illustrated in a detached state. FIG. 2 is a plan view of the HDD in a state without the cover.

As illustrated in FIG. 1, the HDD includes a rectangular casing 10. The casing 10 includes a base 12 having a rectangular box shape opened upward, and a cover (top cover) 14. The base 12 includes a rectangular bottom plate 12a and side walls 12b that are upright along circumferential edges of the bottom plate 12a, and is integrally formed of material such as aluminum. The cover is made of, for example, stainless steel and has a rectangular plate shape. The cover 14 is screw-fastened onto the side walls 12b of the base 12 using a plurality of screws 13 and hermetically seals an upper opening of the base 12.

As illustrated in FIGS. 1 and 2, the casing 10 contains a plurality of, for example, 9 magnetic disks 18 as disk-shaped recording media, and a spindle motor 19 to support and rotate the magnetic disks 18. The spindle motor 19 is disposed on the bottom plate 12a. The magnetic disks 18 are fitted to a hub of the spindle motor 19 coaxially with respect to one another and clamped by a clamp spring 20. Thus, the plurality of magnetic disks 18 are coaxially stacked at predetermined intervals and supported at positions parallel to the bottom plate 12a of the base 12. The plurality of magnetic disks 18 are rotated in a direction indicated by the arrow B at a predetermined rotational speed by the spindle motor 19. It should be noted that the mounting number of the magnetic disks 18 is not limited to 9 but may be 8 or less or 10 or more and 12 or less.

Each of the magnetic disks 18 has a disk shape having a diameter of 95 mm (3.5 inches) and includes a substrate made of non-magnetic material such as aluminum and magnetic recording layers formed on an upper surface and a lower surface of the substrate. Each of the magnetic recording layers includes an annular non-recording region NR on an outer peripheral edge of the substrate and a data recording region (also referred to as valid recording region) RR on an inner peripheral side of the non-recording region NR. In an example, a radius R of the magnetic disk 18 is supposed to be R47.5 (ϕ95) mm to R50.5 (ϕ101) mm, and a radius of the data recording region RR on the disk surface is set in a range of R44.7 mm to R49.7 mm. Consequently, at a peripheral edge portion of the magnetic disk 18, a width of the non-recording region NR outside of the data recording region RR is approximately 0.8 mm to 2.8 mm. The magnetic disk 18 has a plate thickness of approximately 0.6 mm.

The magnetic disk 18 is not limited to a 3.5-inch standard disk but may be a 2.5-inch standard magnetic disk. In the case of the 2.5-inch standard magnetic disk, a radius of the magnetic disk 18 is set in a range of R32.5 (ϕ65) mm to R35 (ϕ70) mm, and a radius of the data recording region RR on the disk surface is set in a range of R29.7 mm to R34.2 mm. Consequently, at a peripheral edge portion of the magnetic disk 18, a width of the non-recording region NR outside of the data recording region RR is approximately 0.8 mm to 2.8 mm.

The casing 10 contains a plurality of magnetic heads to record and reproduce information on and from the magnetic disks 18, and a head actuator 22 to support the magnetic heads 17 movably relative to the magnetic disks 18. The casing 10 also contains a voice coil motor (VCM) 24 to rotate and position the head actuator 22, a ramp load mechanism 25 to hold the magnetic heads 17 at unloaded, parked positions apart from the magnetic disks 18 when the magnetic heads 17 move to the outermost peripheries of the magnetic disks 18, a substrate unit 21 on which electronic components such as conversion connectors are mounted, and a spoiler 70.

A printed circuit board 27 is screw-fastened to an outer surface of the bottom plate 12a of the base 12. The printed circuit board 27 contains a controller circuit that controls operation of the spindle motor 19 and control operation of the VCM 24 and the magnetic heads 17 via the substrate unit 21.

The ramp load mechanism 25 includes a ramp 80. The ramp 80 is secured to the bottom plate 12a of the base 12 and is in the vicinity of the peripheral edge portions of the magnetic disks 18. While the HDD is in non-operation, and when each of the magnetic heads 17 moves away from the outer periphery of the magnetic disk 18 to a predetermined stop position, a tab 46 of a suspension assembly 30, described later, slides on the ramp 80. Thus, the magnetic head 17 is held at a position apart from the magnetic disk 18.

In FIG. 1, the head actuator 22 is rotated to a desired operation position (known as seek position), and each of the magnetic heads 17 is opposed to the data recording region RR of the magnetic disk 18. In FIG. 2, the head actuator 22 is rotated to a retracted position illustrated in the drawing, and the magnetic head 17 is held at the parked position away from the magnetic disk 18.

Figure 4:
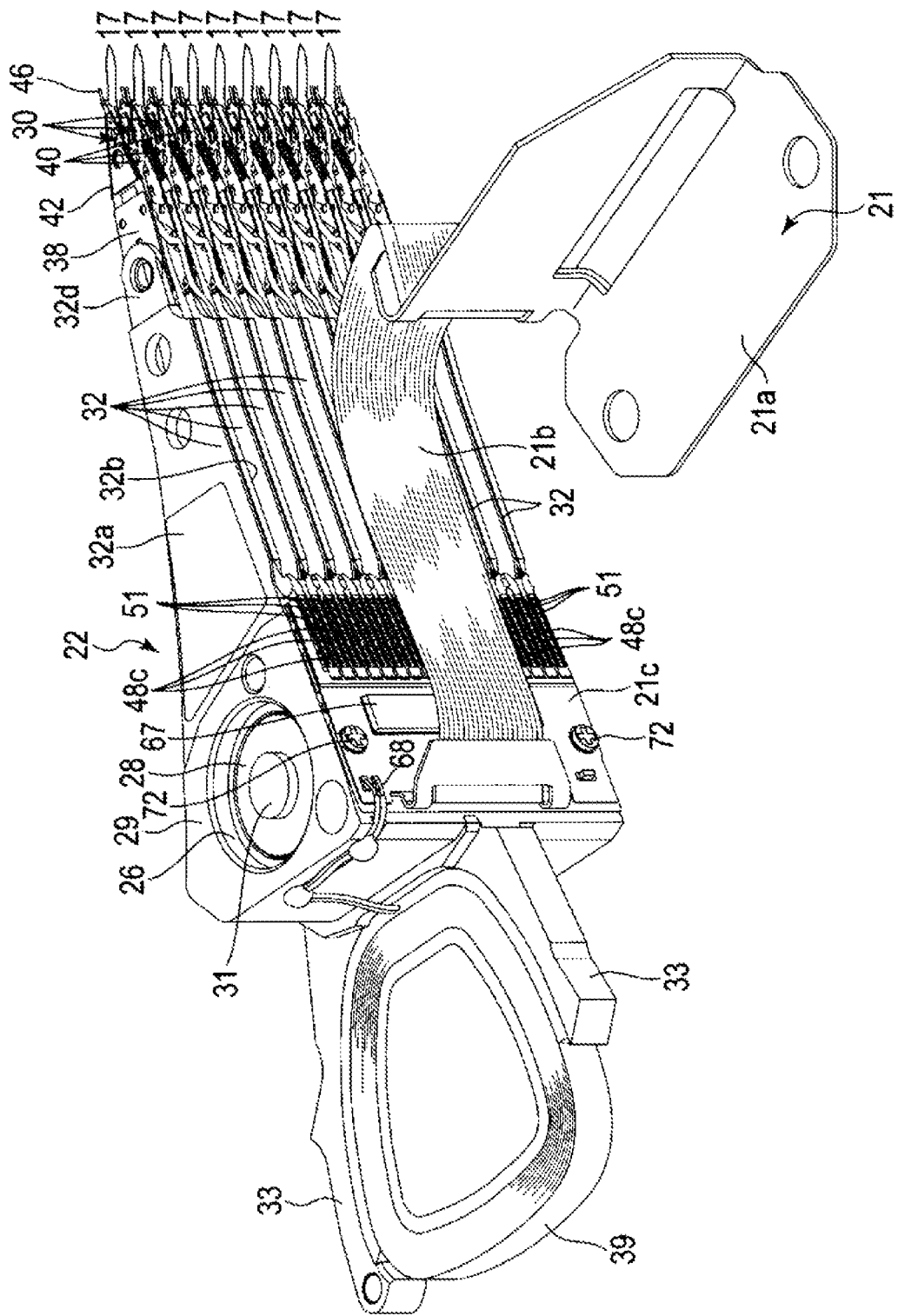
FIG. 4 is a perspective view of the head actuator and an FPC unit of the HDD.

FIG. 4 is a perspective view of the head actuator 22, as viewed from a side opposite to the magnetic disks 18 side. As illustrated in the drawing, the head actuator 22 includes an actuator block 29 having a through hole 26, a bearing unit 28 disposed in the through hole 26, a plurality of (for example, 10) arms 32 extending from the actuator block 29, the suspension assemblies (also referred to as head gimbal assemblies (HGAs)) 30 attached to the respective arms 32, and the magnetic heads 17 supported by the respective suspension assemblies 30. A support shaft 31 stands upright on the bottom plate 12a of the base 12. The actuator block 29 is supported rotatably about the support shaft 31 by the bearing unit 28.

In this embodiment, the actuator block 29 and the arms 32 are integrally formed of material such as aluminum and make up what is referred to as an E block. Each of the arms has, for example, an elongated flat plate shape and extends from the actuator block 29 in a direction orthogonal to the support shaft 31. The arm 32 has a rectangular cross-sectional shape and has a plate thickness T of approximately 1 mm. The arm 32 includes an upper surface 32a, a lower surface 32b opposed and parallel to the upper surface 32a, and a side surface 32c located on the magnetic disk side and intersecting the upper surface 32a and the lower surface 32b. The arms 32 are disposed at intervals of approximately 1.2 mm to 1.5 mm and in parallel to one another. That is, each of the arms 32 has a lower surface at an interval from and opposed and parallel to an upper surface of the adjacent arm 32 below.

The head actuator 22 includes a support frame 33 extending from the actuator block 29 in a direction opposite to the arms 32. This support frame 33 supports a voice coil 39 that is a part of the VCM 24. Referring to FIG. 1, the voice coil 39 is disposed between a pair of yokes 37 one of which is secured onto the base 12. The voice coil 39, the yokes 37, and a magnet secured to one of the yokes 37 make up the VCM 24.

As illustrated in FIG. 4, the head actuator 22 includes the 18 suspension assemblies 30 supporting the corresponding magnetic heads 17. The suspension assemblies 30 are each attached to an extension end 32d of each of the arms 32. The plurality of suspension assemblies 30 include upward head-suspension assemblies to support the magnetic heads 17 upward and downward head-suspension assemblies to support the magnetic heads 17 downward. The upward head-suspension assemblies and the downward head-suspension assemblies are the suspension assemblies 30 of an identical configuration facing vertically opposite directions.

In this embodiment, as illustrated in FIG. 4, the downward head-suspension assembly 30 is attached to the uppermost arm 32, and the upward head-suspension assembly 30 is attached to the lowermost arm 32. The upward head-suspension assembly 30 and the downward head-suspension assembly 30 are attached to each of the 7 intermediate arms 32.

Each of the suspension assemblies 30 includes a substantially rectangular base plate 38, a load beam 42 made of an elongated leaf spring, and an elongated belt-shaped flexure 40. The flexure 40 includes a gimbal portion, described later, on which the magnetic head 17 is mounted. A proximal end portion of the base plate 38 is secured to the extension end 32d of the arm 32 by caulking, for example. The load beam 42 has a proximal end portion superposed on and secured to an end portion of the base plate 38. The load beam 42 extends from the base plate 38 and is tapered toward an extension end. The base plate 38 and the load beam 42 are made of, for example, stainless steel. The tab 46 protrudes from a distal end of the load beam 42. The tab 46 is engageable with the ramp 80, and the tab 46 and the ramp 80 constitute the ramp load mechanism 25.

As illustrated in FIG. 4, the substrate unit 21 integrally includes a base portion 21a having a substantially rectangular shape and bent in an L-shape in cross section, a relay portion 21b having an elongated belt shape and extending from one side edge of the base portion 21a, and a connection portion 21c continuous from a tip of the relay portion 21b. The base portion 21a, the relay portion 21b, and the connection portion 21c are formed of a flexible printed circuit board (FPC) and so the substrate unit 21 is also referred to herein as an FPC unit. The flexible printed circuit board includes an insulating layer of material such as polyimide, a conductive layer formed on the insulating layer, and a protective layer covering the conductive layer. Elements such as a plurality of sets of wiring and a plurality of connection pads are formed on the conductive layer.

On the base portion 21a, electronic components such as a conversion connector and a plurality of capacitors, not illustrated, are mounted and electrically connected to wiring, not illustrated. A metal plate to function as a reinforcement plate is adhered to the base portion 21a. The base portion 21a is disposed on the bottom plate 12a of the base 12. The relay portion 21b extends from the side edge of the base portion 21a toward the actuator block 29. The connection portion 21c on the extension tip of the relay portion 21b has a rectangular shape having substantially the same height and width as a side surface (connection surface) of the actuator block 29. The connection portion 21c is adhered to the connection surface of the actuator block 29 through a backing plate made of material such as aluminum, and is screw-fastened to the connection surface with screw-fasteners 72. A large number of connection pads are disposed on the connection portion 21c. One head IC (also referred to as a head amplifier) 67, for example, is mounted on the connection portion 21c, and this head IC 67 is connected to the connection pads and the base portion 21a with wiring. A connection terminal 68 to which the voice coil 39 is connected is disposed on the connection portion 21c.

The flexure 40 of each of the suspension assemblies includes a first end electrically connected to the magnetic head 17, a second end extending to the actuator block 29 through a groove formed in a side edge of the arm 32, and a connection end portion (e.g., tail connector terminal) 48c disposed on the second end. The connection end portion 48c has an elongated rectangular shape. A plurality of, for example, 9 connector terminals (which are connection pads) 51 are disposed on the connection end portion 48c. These connector terminals 51 are each connected to wiring of the flexure 40. That is, a plurality of sets of wiring of the flexure 40 extend over a substantially entire length of the flexure 40 and have one end electrically connected to the magnetic head 17 and the other end connected to the connector terminals 51.

The connector terminals 51 disposed on the connection end portions 48c of the 18 flexures 40 are bonded to the connection pads of the connection portion 21c and electrically connected to wiring of the connection portion 21c with the connection pads. Thus, the 18 magnetic heads 17 of the head actuator 22 are each electrically connected to the base portion 21a of the FPC unit 21 with the wiring of the flexure 40, the connection end portion 48c, the connection portion 21c, and the relay portion 21b.

Figure 3:
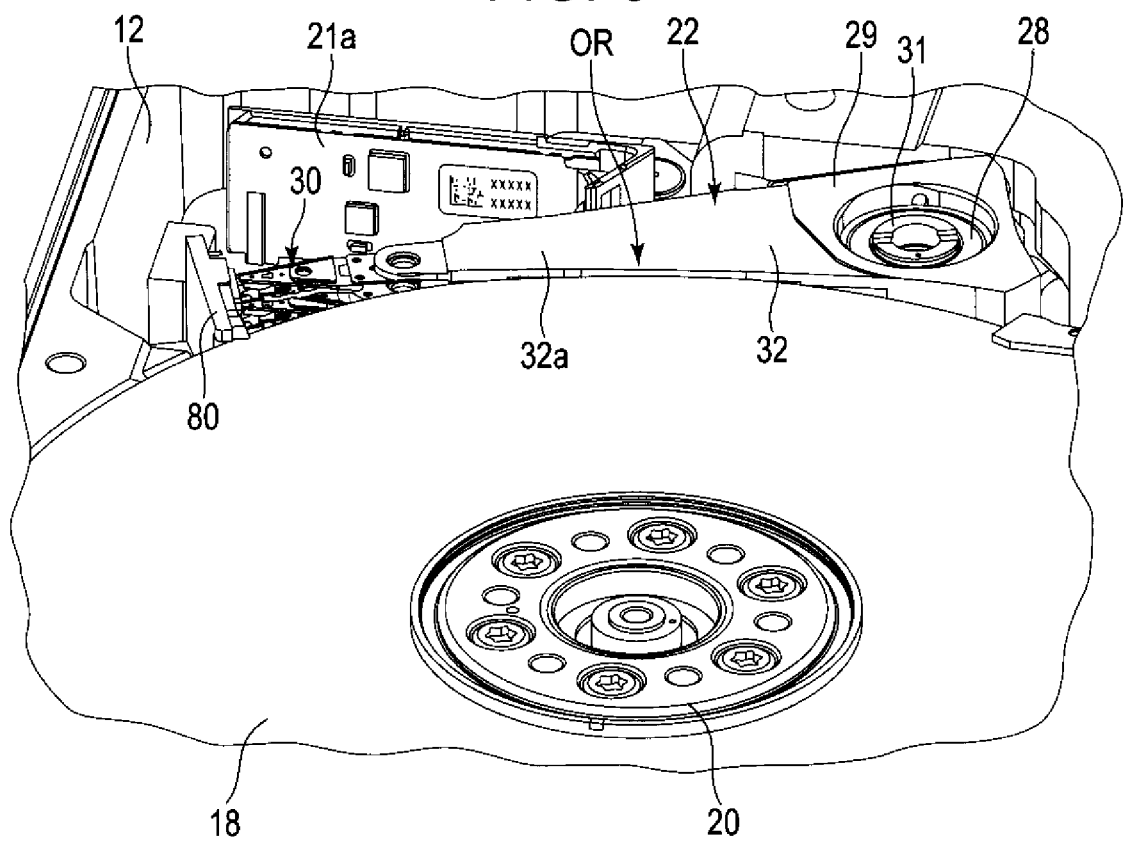
FIG. 3 is a partial perspective view of a head actuator and a magnetic disk of the HDD.

FIG. 3 is a partial perspective view of the head actuator 22 and the magnetic disk 18.

As illustrated in FIGS. 1 to 3, with the head actuator 22 of the above-described configuration being installed on the base 12, the support shaft 31 stands upright substantially in parallel to the spindle of the spindle motor 19. The plurality of arms 32 of the head actuator 22 extend substantially in parallel to the surface of the magnetic disk 18 and the base plate 12a of the base 12. The head actuator 22 and the 9 magnetic disks 18 are arranged in such a positional relationship that each of the magnetic disks 18 is opposed to an interval between each pair of the arms 32. When the head actuator 22 is rotated to an operation position, each of the magnetic disks 18 is located between each pair of the suspension assemblies 30, and the magnetic heads 17 are respectively opposed to an upper surface and a lower surface of the magnetic disk 18.

As illustrated in FIGS. 2 and 3, when the head actuator 22 is displaced to a retracted position, part of an outer-peripheral edge portion of the magnetic disk 18 is between the pair of the arms 32 of the head actuator 22. That is, a disk-side edge portion of each of the arms 32 has an overlapping region OR that overlaps the outer-peripheral edge portion of the magnetic disk 18 in a thickness direction. At the retracted position, the tab 46 of each of the suspension assemblies 30 is on a guide surface of the ramp 80 and is held at a predetermined stop position.

Next, a configuration of the overlapping region OR of the head actuator 22 will be described more specifically.

Figure 5:
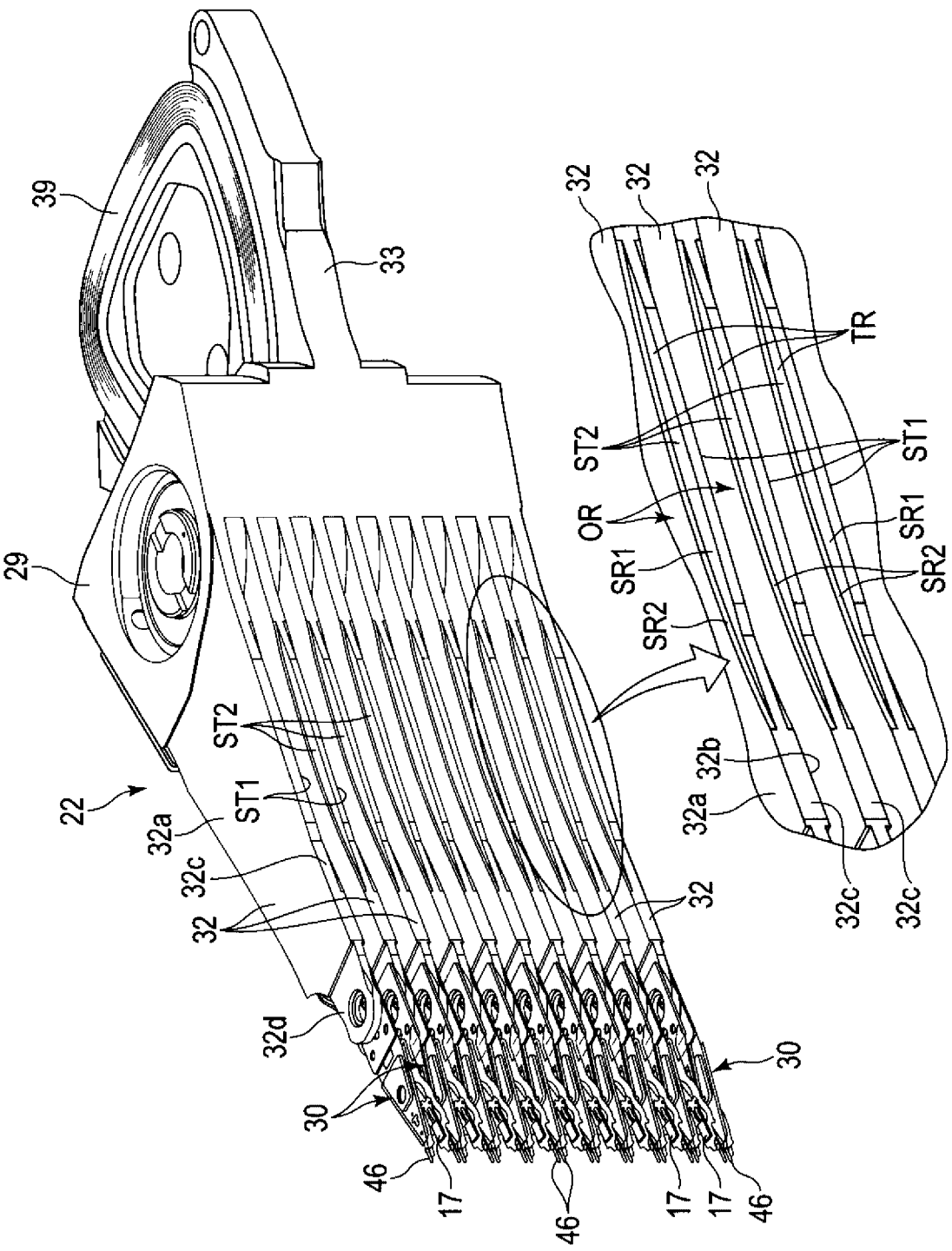
FIG. 5 is a perspective view of a magnetic disk side of the head actuator and an enlarged perspective view of part of the magnetic disk side.
Figure 6:
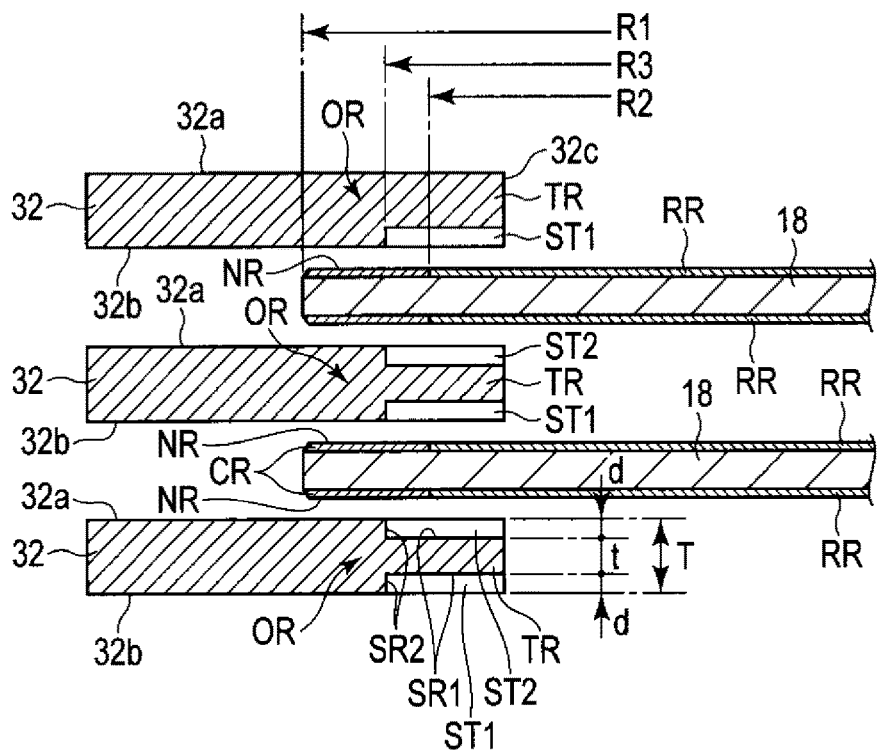
FIG. 6 is a cross-sectional view of arms of the head actuator and peripheral edge portions of the magnetic disks.
Figure 7:
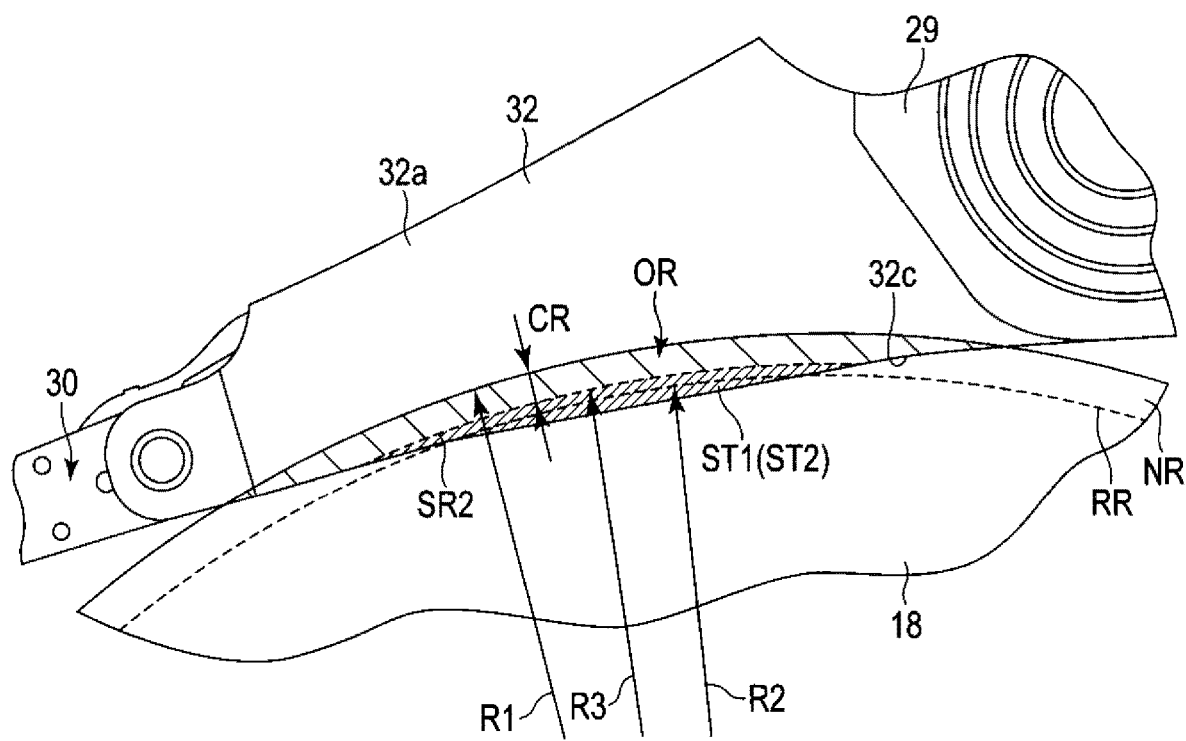
FIG. 7 is a schematic plan view illustrating an overlapping state of the actuator arm and the peripheral edge portion of the magnetic disk.

FIG. 5 is a perspective view of a magnetic disk side of the head actuator 22 and an enlarged perspective view of part of the magnetic disk side. FIG. 6 is a cross-sectional view of the arms 32 of the head actuator 22 and peripheral edge portions of the magnetic disks 18. FIG. 7 is a schematic plan view of an overlapping state of the arm 32 and the peripheral edge portion of the magnetic disk 18.

As illustrated in the drawings, the disk-side edge portion of each of the arms 32 has the overlapping region OR that overlaps the peripheral edge portion of the magnetic disk 18. At least part of the overlapping region OR, that is, at least a first area of the overlapping region OR that overlaps the data recording region RR of the magnetic disk 18 has a thickness in a direction orthogonal to the surfaces 32a and 32b smaller than the rest of the arm 32 other than the overlapping region OR. In this embodiment, at the side edge portion of the arm 32, the cut-off portions, steps ST1 and ST2, are formed at the upper surface 32a and the lower surface 32b that are opposed to the surfaces of the magnetic disks 18 so as to obtain a thinned portion TR that is decreased in thickness. The uppermost arm 32 includes the step ST1 at the lower surface 32b only, and the lowermost arm 32 includes the step ST2 at the upper surface 32a only.

Each of the steps ST1 and ST2 has a bottom surface SR1 substantially parallel to the disk surface, and a circumferential surface SR2 which is substantially perpendicular to the surface of the arm 32 and the bottom surface SR1. Each of the steps ST1 and ST2 is opened toward the disk-side surface 32c of the arm 32 and the upper surface 32a or the lower surface 32b of the arm 32. Each of the steps ST1 and ST2 has a depth (depth in an arm thickness direction) "d" of approximately 0.03 mm to 0.3 mm. Preferably, the depth "d" is equal to or larger than 0.03 mm considering machining precision in forming the steps ST1 and ST2 and is equal to or smaller than 0.3 mm considering machining the arm 32 having a plate thickness of approximately 1 mm from both of the upper and lower surfaces 32a and 32b to form the steps ST1 and ST2 and considering securing rigidity of the arm 32 after machining.

In view of this, the thinned portion TR of the arm 32 has a thickness "t" of 0.4 mm to 0.94 mm (when both of the upper and lower surfaces 32a and 32b are stepped) or 0.7 mm to 0.97 mm (when only one of the upper and lower surfaces 32a and 32b is stepped).

In this embodiment, the circumferential surface SR2 of each of the steps ST1 and ST2 has an arcuate shape about the center of the magnetic disk 18. As illustrated in FIGS. 6 and 7, in the 3.5-inch standard magnetic disk 18, a disk radius R1 (which is equivalent to a radius of an arcuate edge of the overlapping region OR) is R47.5 ($\phi$95) mm to R50.5 ($\phi$101) mm, and a radius R2 of the data recording region RR is approximately R44.7 mm to R49.7 mm. A radius R3 of the circumferential surface SR2 is approximately 45 mm to 50 mm, which is smaller than the disk radius R1 and larger than the radius R2 of the data recording region RR. Thus, in each of the surfaces of the magnetic disk 18, a contactable area CR having a width of approximately 0.5 mm to 2.5 mm is allocated outside of the data recording region RR.

It should be noted that when a 2.5-inch standard magnetic disk is used, the radius R1 of the magnetic disk 18 is R32.5 ($\phi$65) mm to R35 ($\phi$70) mm, and consequently, the radius R3 of the circumferential surface SR2 of each of the steps ST1 and ST2 is approximately R30 mm to R34.5 mm to ensure that the contactable area CR outside of the data recording region RR has a width of approximately 0.5 mm to 2.5 mm.

Figure 8A:
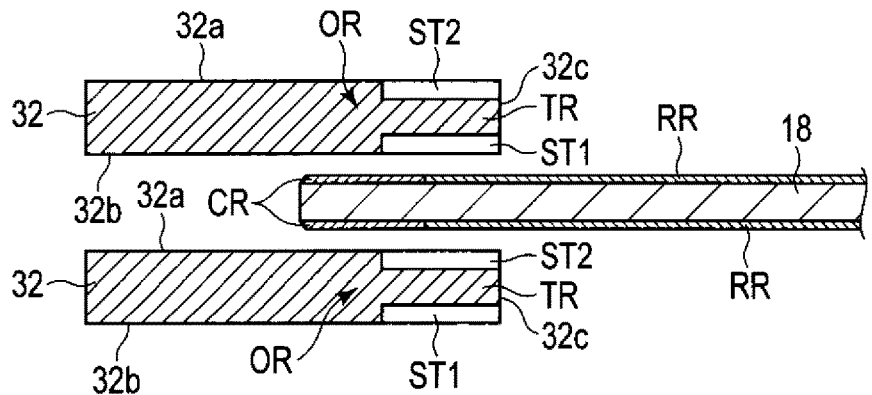
FIGS. 8A to 8D are cross-sectional views of the arms and the magnetic disk, each illustrating a positional relationship of the arms and the magnetic disk.
Figure 8B:
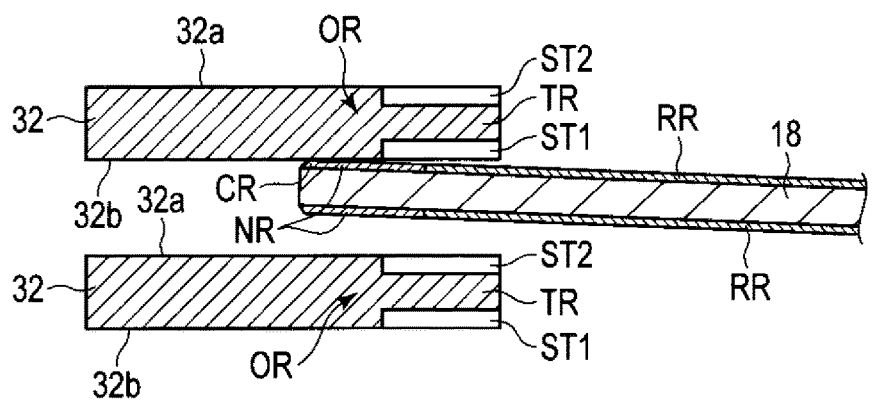
Figure 8C:
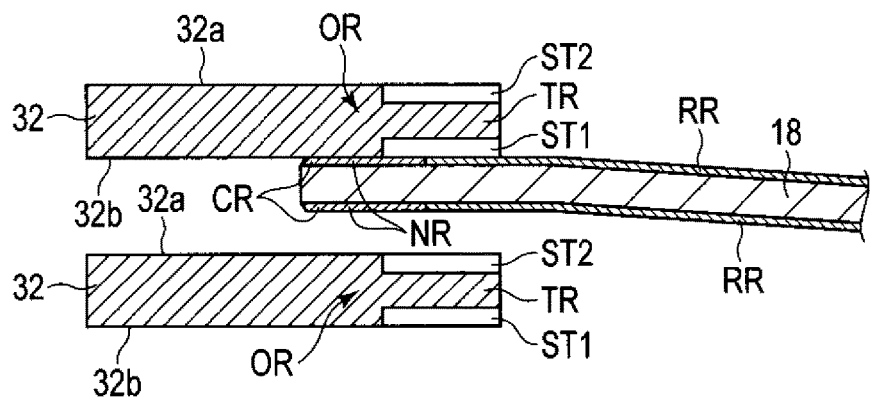
Figure 8D:
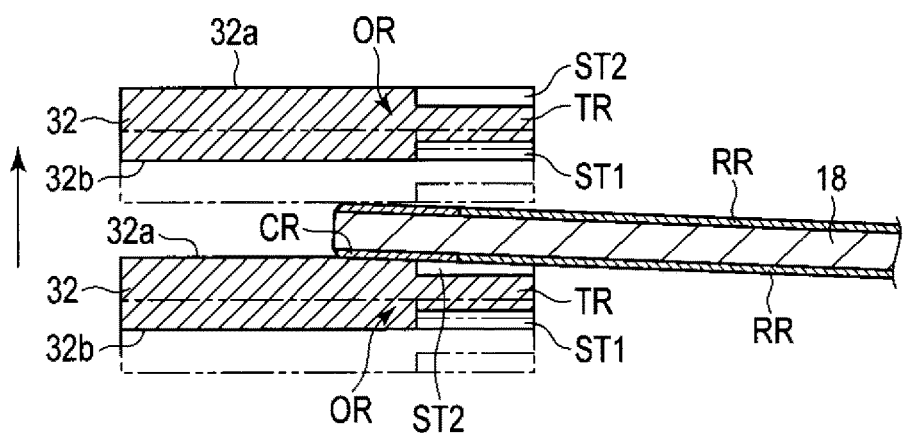

FIGS. 8A to 8D are cross-sectional views of the arms 32 and the magnetic disk 18. FIG. 8A illustrates a normal positional relationship, and FIGS. 8B, 8C, and 8D illustrate positional relationships when mechanical stress from the outside deforms the magnetic disk 18 and displaces the arms 32 vertically.

As illustrated in FIG. 8A, in the HDD of the above-described configuration, when the head actuator 22 is at a retracted position in a normal state, part of the outer peripheral edge of each of the magnetic disks 18 is positioned in a clearance region between the two opposed arms 32 and opposed to the overlapping regions OR of the arms 32 at intervals.

As illustrated in FIGS. 8B and 8C, when external mechanical stress is applied to the HDD to deform or vibrate the peripheral edge portion of the magnetic disk 18, a corner of the outer-peripheral edge portion at the contactable area CR of the magnetic disk 18 first abuts against the lower surface 32b (or the upper surface 32a) of the arm 32, and then, the outer-peripheral edge portion is deformed to come into contact with the lower surface 32b (or the upper surface 32a) of the arm 32. At this time, because an outer peripheral portion of the data recording region RR of the magnetic disk 18 is opposed to the thinned portion TR of the arm 32, that is, the step ST1 in this case, the magnetic disk 18 even when deformed does not come into contact with the arm 32.

As illustrated in FIG. 8D, when mechanical stress is applied from the outside to vertically displace or vibrate the arm 32 of the head actuator 22, the upper surface 32a (or the lower surface 32b) of the arm 32 comes into contact with the outer-peripheral edge portion at the contactable area CR of the magnetic disk 18. At this time, because the outer peripheral portion of the data recording region RR of the magnetic disk 18 is opposed to the thinned portion TR of the arm 32, that is, the step ST2 in this case, the outer peripheral portion does not come into contact with the arm 32 even displaced.

As described above, both when external mechanical stress deforms or vibrates the magnetic disk 18 and when external mechanical stress vibrates the arm 32, the data recording region RR of the magnetic disk 18 is prevented from being scratched or damaged by interfering with the arm 32. This improves shock resistance of the HDD to improve reliability. There is no need to dispose the head actuator 22 apart from the magnetic disks 18 or make the arms 32 longer to avoid contact between the data recording regions RR and the arms 32. This makes it possible to improve shock resistance, seek performance, and vibration resistance.

The arms 32 of the head actuator 22 are made of metal such as aluminum and have relatively high strength. When receiving mechanical stress from the outside, surfaces of the arms 32 having high strength receive vibration of the magnetic disks 18 to reduce vibration or deformation of the magnetic disks 18 to a relatively low level. This contributes to prevention of contact between the ramp 80 and the magnetic disks 18 and relief of mechanical stress at the time of contact. This effectively prevents deformation and breakage of the ramp 80 required to have high dimensional accuracy although the ramp 80 is made of resin and is not very strong.

In view of this, the first embodiment provides the magnetic disk device with improved shock resistance.

Next, HDDs according to other embodiments will be described. It should be noted that in the following embodiments, substantially the same components as in the first embodiment described above are denoted with identical reference numerals and signs and will not be described in detail here. Different components from those in the first embodiment will be mainly described in detail.

Figure 10:
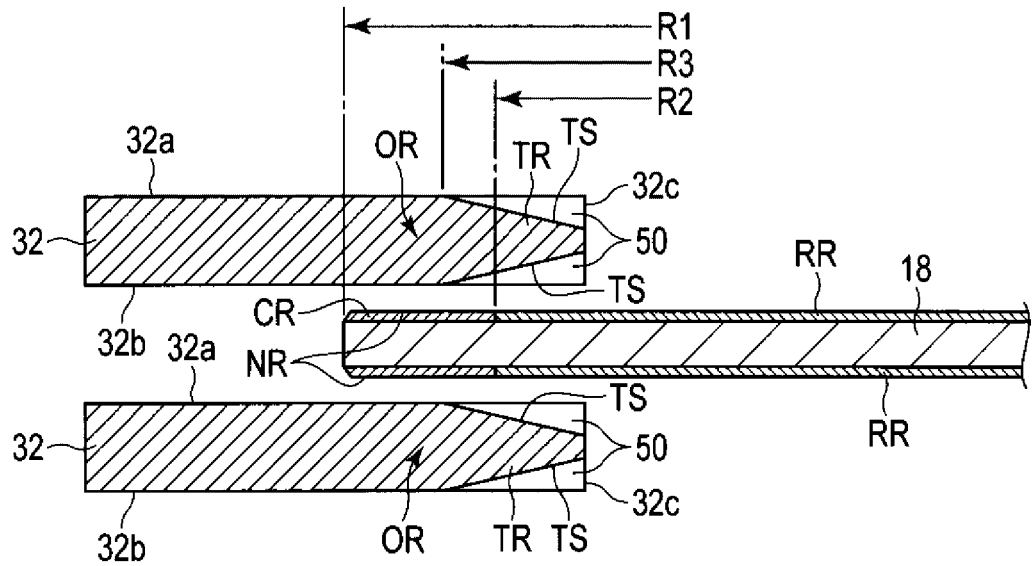
FIG. 10 is a cross-sectional view of the arms of the head actuator and the peripheral edge portion of the magnetic disk in the second embodiment.

(Second Embodiment) FIG. 9 is a perspective view of the head actuator 22 of an HDD according to a second embodiment. FIG. 10 is a cross-sectional view of the arms 32 of the head actuator 22 and the magnetic disk 18.

As illustrated in the drawings, according to the second embodiment, cut-off portions 50 that define the thinned portion TR of each of the arms 32 are not stepped but tapered and have triangular cross-sectional shapes. That is, bottom surfaces of the cut-off portions 50 are tapered surfaces (also, inclined surfaces) TS to chamfer upper and lower corners of the disk-side edge portion of the arm 32. The thinned portion TR has a thickness gradually decreased toward the side edge of the arm 32. The minimum thickness of the thinned portion TR is 0.4 mm to 0.94 mm (when both of the upper and lower surfaces 32a and 32b are cut off) or 0.7 mm to 0.97 mm (when only one of the upper and lower surfaces 32a and 32b are cut off). The radius R3 of a circumferential edge of each of the tapered surfaces TS is approximately 45 mm to 50 mm, which is smaller than the radius R1 of the magnetic disk 18 and larger than the radius R2 of the data recording region RR.

The second embodiment of the above-described configuration also provides substantially the same function and effect as the first embodiment described above.

Figure 11:
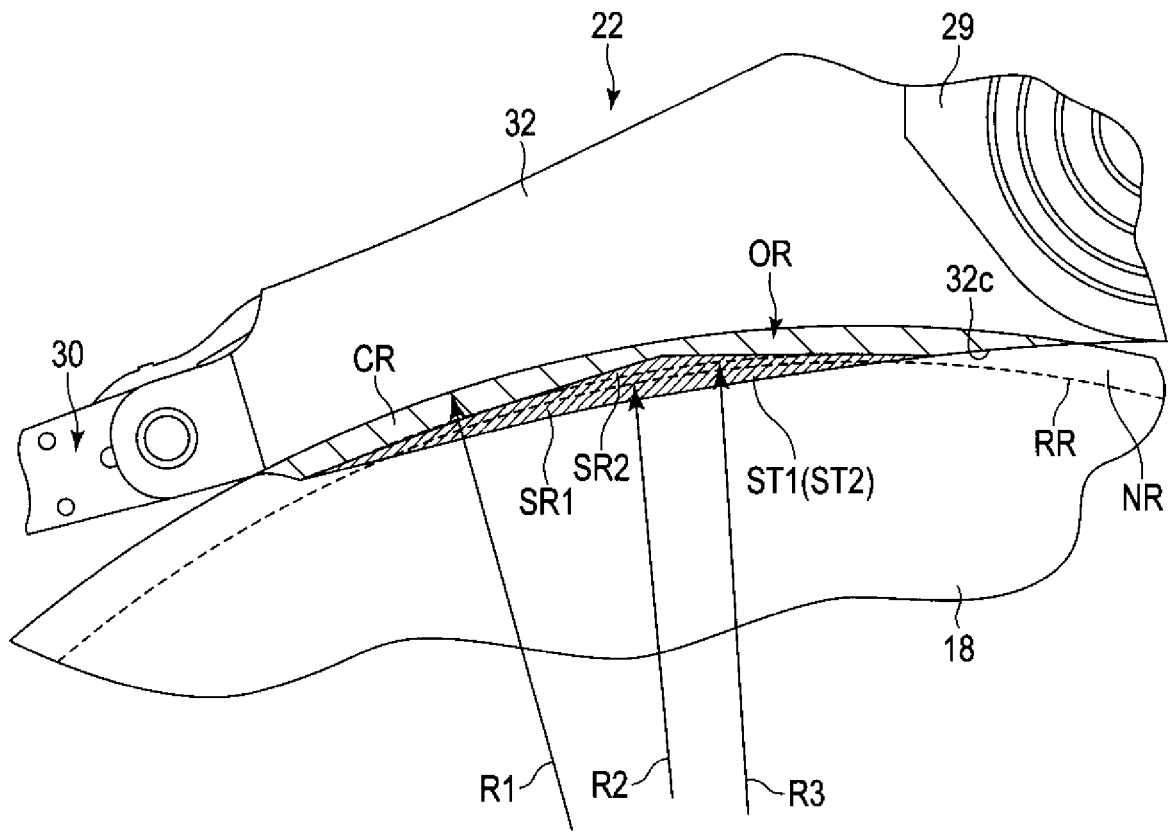
FIG. 11 is a schematic plan view illustrating an overlapping state of the actuator arm and the peripheral edge portion of the magnetic disk of an HDD according to a third embodiment.

(Third Embodiment) FIG. 11 is a plan view of the head actuator 22 and a peripheral edge portion of the magnetic disk 18 in an HDD according to a third embodiment.

In the first and second embodiments described above, the steps ST1 and ST2 and the tapered surfaces TS that define the cut-off portions 50 have arcuate circumferential surfaces or circumferential edges parallel to the outer periphery of the magnetic disk 18. However, the steps ST1 and ST2 and the tapered surfaces TS are not necessarily limited to the arcuate shapes but may have other shapes to allocate a wide area where the magnetic disk 18 and the surface of the arm 32 come into contact with each other outside of the data recording region RR.

As illustrated in FIG. 11, according to the third embodiment, the circumferential surface SR2 of each of the steps ST1 and ST2 is partly shaped not in parallel to the outer periphery of the magnetic disk 18. For example, a center portion of the circumferential surface SR2 in a circumferential direction has a triangular shape protruding toward the outer peripheral edge of the magnetic disk 18. The circumferential surface SR2 is radially outside of the outer periphery of the data recording region RR.

The third embodiment of the above-described configuration also provides substantially the same function and effect as the first embodiment described above.

The present disclosure is not limited to the above-described embodiments as they are but may be implemented by modifying the components without departing from the subject matter of the present disclosure. Various implementations are possible by appropriately combining two or more of the components disclosed in the embodiments. For example, some of the components described in the embodiments may be omitted. Moreover, the components in the different embodiments may be combined as suited.

Shapes and dimensions of the components are not limited to the above-described embodiments but may be changed. In the embodiments, the stepped or tapered cut-off portions at the upper surface 32a and the lower surface 32b of each of the arms 32 have an identical depth. However, this is not required, and the stepped or tapered cut-off portions may be different in depth. The stepped or tapered cut-off portions may not necessarily be formed at both of the upper and lower surfaces 32a and 32b of the arm 32 but may be formed at one of the upper and lower surfaces 32a and 32b.

Figure 12:
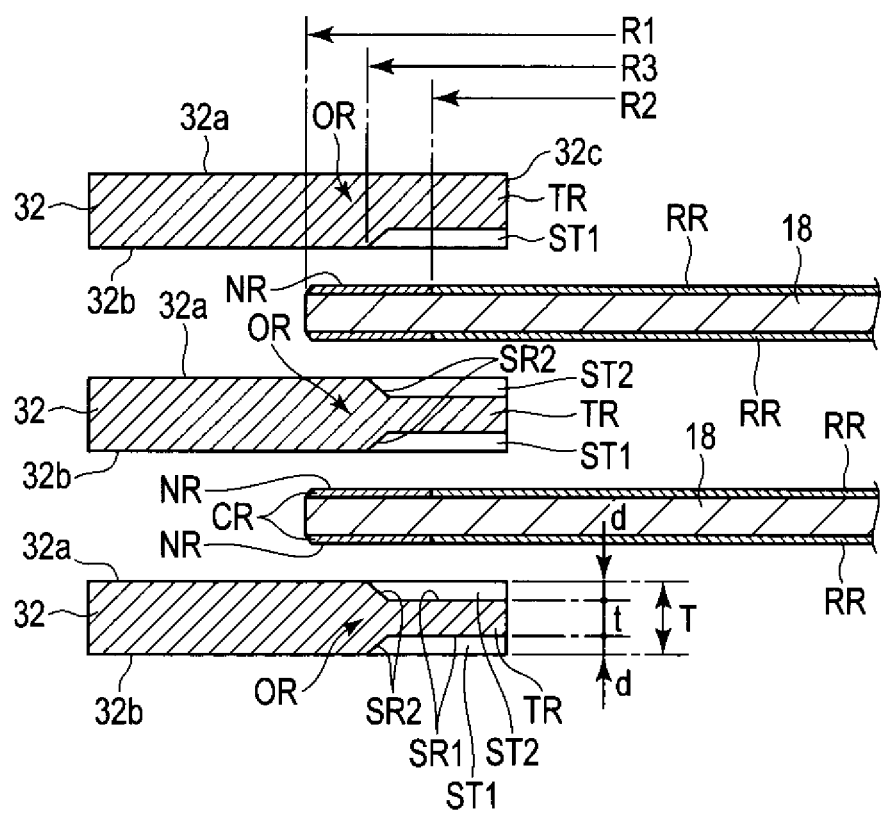
FIG. 12 is a cross-sectional view of the arms of the head actuator and the peripheral edge portions of the magnetic disks according to a modification.

In the first embodiment, although the circumferential surface SR2 that defines each of the stepped cut-off portions is substantially perpendicular to the bottom surface SR1 and the surface of the arm 32, this is not required. As in a modification illustrated in FIG. 12, the circumferential surface SR2 may stand from the bottom surface SR1 and be tilted. That is, the circumferential surface SR2 may be at an angle from a direction orthogonal to the bottom surface SR1 and the surface of the arm 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a magnetic disk having a data non-recording region, and a data recording region inside the data non-recording region;
   a ramp;
   a plurality of heads configured to read and write information from and onto the magnetic disk; and
   a plurality of arms supporting the heads, the arms being rotatable to move the heads from a parked position on the ramp to a desired data recording position above or below the magnetic disk,
   wherein the heads in the parked position on the ramp are spaced apart from the magnetic disk in a radial direction of the magnetic disk,
   wherein each of the arms comprises an overlapping region that overlaps the data recording region of the magnetic disk in a thickness direction of the magnetic disk when the heads are at the parked position on the ramp, and
   wherein the overlapping region of each arm comprises a first area, which overlaps the data recording region of the magnetic disk in the thickness direction of the magnetic disk when the heads are at the parked position on the ramp, and a second area, which does not overlap the data recording region of the magnetic disk in the thickness direction of the magnetic disk when the heads are in the parked position on the ramp, the first area having a thickness that is smaller than a thickness of the second area.

2. The disk device according to claim 1, wherein the overlapping region of each arm further comprises a third area between the first area and the second area.

3. The disk device according to claim 2, wherein the thickness of the first area is constant.

4. The disk device according to claim 3, wherein the third area includes a wall having a surface that is substantially perpendicular to a surface of the arm.

5. The disk device according to claim 3, wherein the third area includes a wall having a surface that is inclined with respect to a surface of the arm.

6. The disk device according to claim 2, wherein the first area is tapered so that the thickness thereof decreases towards an edge thereof.

7. The disk device according to claim 1, wherein the arm has a normal thickness portion and a thinned portion at the overlapping region.

8. The disk device according to claim 7, wherein the thickness of the thinned portion is constant.

9. The disk device according to claim 8, wherein the arm has a thickness transition area that includes a wall having a surface that is substantially perpendicular to a surface of the arm.

10. The disk device according to claim 8, wherein the arm has a thickness transition area that includes a wall having a surface that is inclined with respect to a surface of the arm.

11. The disk device according to claim 7, wherein the thinned portion is tapered so that a thickness thereof decreases towards an edge thereof.

12. A disk device comprising:
   a first magnetic disk having a first data non-recording region, and a first data recording region inside the first data non-recording region;
   a second magnetic disk having a second data non-recording region, and a second data recording region inside the second data non-recording region;
   a ramp;
   a first head configured to read and write information from and onto the first magnetic disk;
   a second head configured to read and write information from and onto the second magnetic disk; and
   an arm supporting the first and second heads at a first end of the arm, the arm being rotatable about a second end of the arm to move the first and second heads from a parked position on the ramp to a desired data recording position above or below the first and second magnetic disks, wherein the first and second heads in the parked position on the ramp are spaced apart from the first and second magnetic disks in a radial direction of the first and second magnetic disks, wherein the arm has a first region between the first and second ends of the arm, that overlaps the first and second data recording regions in a thickness direction of the magnetic disks when the first and second heads are in the parked position on the ramp, and a thickness of a second region of the arm between the first and second ends of the arm is larger than a thickness of the first region of the arm.

13. The disk device according to claim 12, wherein the thickness of the first region is constant.

14. The disk device according to claim 12, wherein the first region is tapered so that the thickness thereof decreases towards an edge thereof.

\* \* \* \* \*